R. M. VIERUS.
KEY FOR CONNECTING MACHINE PARTS.
APPLICATION FILED JUNE 15, 1917.

1,264,230.

Patented Apr. 30, 1918.

WITNESSES.
H. L. Opsahl.
A. H. Opsahl

INVENTOR.
R. M. VIERUS.
BY HIS ATTORNEYS
Williamson Merchant

UNITED STATES PATENT OFFICE.

ROBERT M. VIERUS, OF WINONA, MINNESOTA.

KEY FOR CONNECTING MACHINE PARTS.

1,264,230.  Specification of Letters Patent.  Patented Apr. 30, 1918.

Application filed June 15, 1917. Serial No. 174,842.

*To all whom it may concern:*

Be it known that I, ROBERT M. VIERUS, a citizen of the United States, residing at Winona, in the county of Winona and State of Minnesota, have invented certain new and useful Improvements in Keys for Connecting Machine Parts; and I do hereby declare the following to be a full, clear, and exact description of the invention, such as will enable others skilled in the art to which it appertains to make and use the same.

My invention relates to keys for connecting machine parts; and, to this end, it consists of the novel devices and combinations of devices hereinafter described and defined in the claim.

In the accompanying drawings, which illustrate the invention, like characters indicate like parts throughout the several views.

Referring to the drawings.

Figure 1:
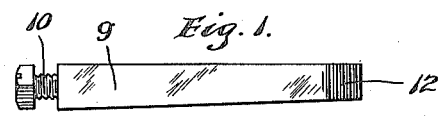
Figure 1 is a plan view of the improved device.
Figure 2:
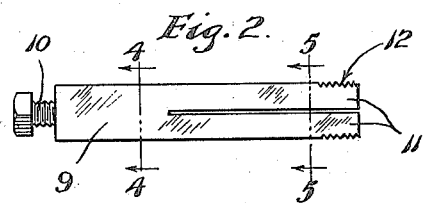
Fig. 2 is a side elevation of the same.
Figure 3:
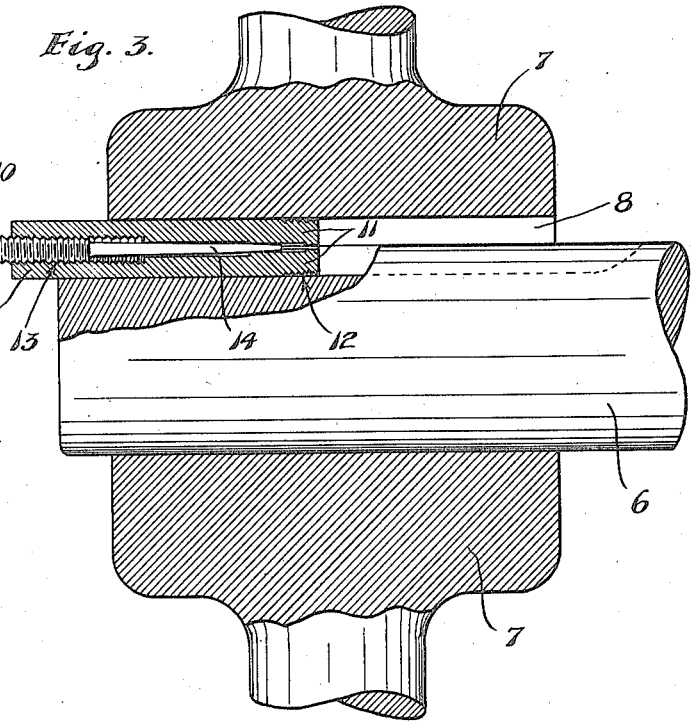
Fig. 3 is a view, principally in central section illustrating the improved key connecting a pulley and shaft for common rotation.
Figure 4:
Fig. 4 is a transverse section taken on the line 4—4 of Fig. 2.
Figure 5:
Fig. 5 is a transverse section taken on the line 5—5 of Fig. 2.

The numeral 6 indicates a shaft having mounted thereon a pulley 7 and which shaft and pulley have formed therein a keyway 8. The shaft 6 and pulley 7 are connected for common rotation by the improved key, which comprises a body member 9 and a screw-operated spreader or wedge 10. The body member 9 of the key is mounted in the keyway 8 and the sides thereof are slightly tapered toward the inner end of the key, so that it will freely enter said key-way. Said inner end portion of the body member 9 of the key is split through the sides thereof to afford a pair of legs 11. The ends of the legs 11 have their outer opposite faces serrated at 12 to increase the hold of the key on the machine parts connected thereby.

Formed in the outer end of the body member 9 of the key is a bore or seat 13, which extends between the legs 11. Mounted in this seat 13, is the expander 10 which, as shown, is in the form of a screw having threaded engagement with the body member 9 of the key and provided at its inner end with a long smooth tapered point 14, which projects between the legs 11. Obviously, by turning the expander 10 to move the same inward, the legs 11 are spread by the tapered point 14 thereof into frictional contact with the shaft 7 and pulley 8, to thereby prevent the key from being pulled from the key-way 9. The serrated surfaces 12 will, of course, greatly assist in holding the key in position.

What I claim is:—

A key for connecting machine parts comprising a body member that is split at one end to afford a pair of legs, and a screw having threaded engagement with the other end of said body member and provided with a tapered inner end extending between said legs for spreading the same.

In testimony whereof I affix my signature in presence of two witnesses.

ROBERT M. VIERUS.

Witnesses:
W. N. HARGESHENNY.
ROBERT E. LOOBY.